(12) United States Patent
Sonntag

(10) Patent No.: US 8,119,909 B2
(45) Date of Patent: Feb. 21, 2012

(54) FASTENING SYSTEM FOR FASTENING A PLATE WITHIN AN ENCLOSURE

(75) Inventor: John-Erik Sonntag, Tammisaari (FI)

(73) Assignee: Fibox Oy AB, Jorvas (FI)

( * ) Notice: Subject to any disclaimer, the term of this patent is extended or adjusted under 35 U.S.C. 154(b) by 904 days.

(21) Appl. No.: 12/114,144

(22) Filed: May 2, 2008

(65) Prior Publication Data

US 2008/0272071 A1    Nov. 6, 2008

(30) Foreign Application Priority Data

May 2, 2007    (FI) .................................... 20075304

(51) Int. Cl.
*H02G 3/14*    (2006.01)
*H05K 5/03*    (2006.01)
*H01H 9/02*    (2006.01)
*H01R 13/08*    (2006.01)

(52) U.S. Cl. .......... 174/50; 211/183; 248/122.1; 174/54

(58) Field of Classification Search .................... 211/26, 211/41.1, 41.17, 182, 183, 189; 248/122.1, 248/125.1, 125.3, 224.8, 295.11; 312/223.1, 312/265.1; 403/331; 174/50, 53, 54, 57
See application file for complete search history.

(56) References Cited

U.S. PATENT DOCUMENTS

| | | | |
|---|---|---|---|
| 4,444,318 A | | 4/1984 | Alexander |
| 4,908,733 A | * | 3/1990 | Zachrei et al. ................ 361/641 |
| 4,941,763 A | * | 7/1990 | Euteneuer .......................... 403/3 |
| 5,084,596 A | * | 1/1992 | Borsh et al. ..................... 174/53 |
| 5,333,950 A | * | 8/1994 | Zachrai ....................... 312/265.1 |
| 5,504,656 A | * | 4/1996 | Joist ............................... 361/754 |
| 5,769,519 A | * | 6/1998 | Nicolai ........................ 312/351.1 |
| 5,940,276 A | * | 8/1999 | Kurrer et al. .................... 361/754 |
| 6,098,816 A | | 8/2000 | Sonntag et al. |
| 6,113,198 A | * | 9/2000 | Hommes .......................... 312/114 |
| 6,121,549 A | * | 9/2000 | Korhonen ......................... 174/66 |
| 6,128,198 A | * | 10/2000 | Kurrer et al. .................... 361/759 |
| 6,190,081 B1 | * | 2/2001 | Besserer et al. ................. 403/231 |
| 6,364,138 B1 | * | 4/2002 | Chen ............................... 211/187 |
| 6,469,247 B1 | * | 10/2002 | Dodds et al. ..................... 174/50 |

(Continued)

FOREIGN PATENT DOCUMENTS

DE         3121967         6/1983

(Continued)

*Primary Examiner* — Darnell Jayne
*Assistant Examiner* — Joshua Rodden
(74) *Attorney, Agent, or Firm* — Birch, Stewart, Kolasch & Birch, LLP

(57) ABSTRACT

A fastening system for fastening a plate within an enclosure for electric installations includes an elongated holder and a support member arranged to be fastened to the holder with a snap-in fastening device. The snap-in fastening device is arranged to fasten the support member detachably to the holder in a direction perpendicular relative to the longitudinal direction of the holder and includes a locking device for fastening the support member to the holder at different points along the holder. In order for the fastening system to provide adequate support to a plate to be installed within the enclosure in all applications, the fastening arrangement includes a flexible catch, which, during the placement of the snap-in fastening device into the locking position, is arranged to yield in a direction perpendicular relative to the longitudinal direction of the holder, and the locking device includes at least one locking element arranged to keep the support member locked in the longitudinal direction of the holder substantially inflexibly.

6 Claims, 2 Drawing Sheets

U.S. PATENT DOCUMENTS

Figure 1:
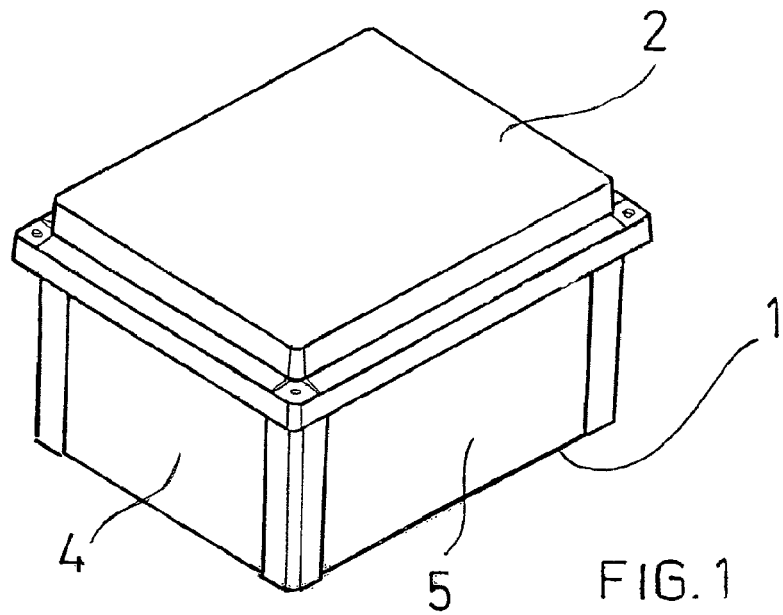

| | | | |
|---|---|---|---|
| 6,575,657 B1 * | 6/2003 | Reuter et al. | 403/231 |
| 6,604,798 B1 * | 8/2003 | Cooney | 312/223.1 |
| 6,642,446 B2 * | 11/2003 | Dodds et al. | 174/50 |
| 7,150,363 B2 * | 12/2006 | Tomonari et al. | 211/90.02 |
| 7,178,765 B2 * | 2/2007 | Huang | 248/122.1 |
| 7,562,897 B1 * | 7/2009 | Sherman et al. | 280/651 |
| 7,784,889 B2 * | 8/2010 | Benner et al. | 312/265.6 |
| 2005/0067360 A1 * | 3/2005 | Darvial | 211/41.14 |
| 2008/0272071 A1 * | 11/2008 | Sonntag | 211/41.1 |

FOREIGN PATENT DOCUMENTS

FR        2654297       5/1991

\* cited by examiner

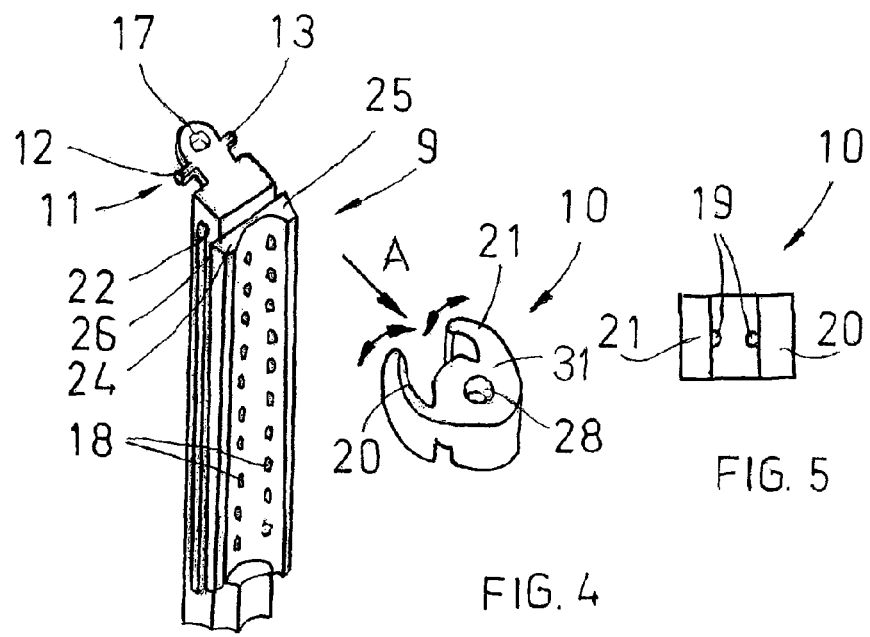
FIG. 3
FIG. 4
FIG. 5
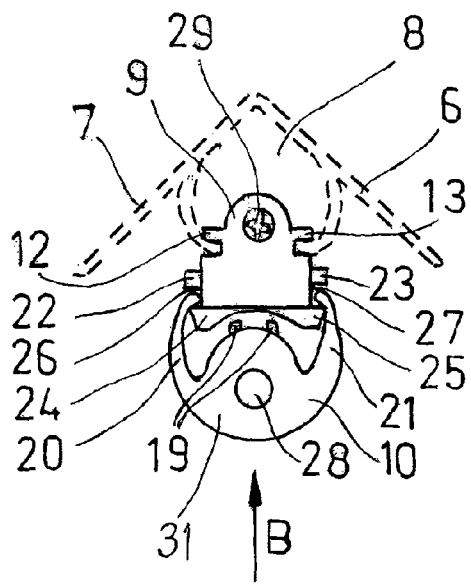
FIG. 6
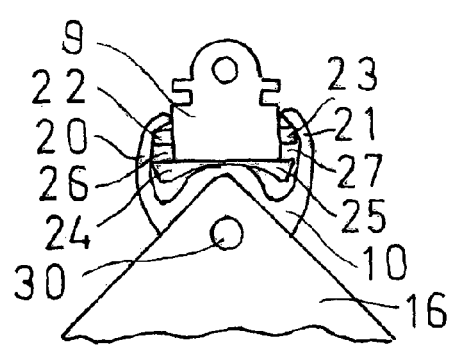
FIG. 7

FASTENING SYSTEM FOR FASTENING A PLATE WITHIN AN ENCLOSURE

CROSS REFERENCE TO RELATED APPLICATIONS

This patent application claims priority to Finnish Patent Application No. 20075304, filed on May 2, 2007, which is hereby incorporated by reference.

BACKGROUND

The invention relates to a fastening system for fastening a plate, such as a front plate or a contact protection plate, within an enclosure for electric installations, the fastening system comprising an elongated holder to be placed vertically within a base of the enclosure and arranged to be fastened to a corner turret within the enclosure, and a support member arranged to be fastened to the holder with snap-in fastening means, the snap-in fastening means being arranged, in a locking position, to fasten the support member detachably to the holder by means of a flexible component included in the fastening system in a direction perpendicular relative to the longitudinal direction of the holder, and the snap-in fastening means comprising locking means for fastening the support member to the holder at different points along the length of the holder while the snap-in fastening means are in the locking position.

A fastening system of the above-described type is known from patent publication U.S. Pat. No. 6,098,816. The main purpose of this known fastening system is to achieve a system enabling the simple and fast arrangement of the support member and the holder for fastening the plate at the desired height in the enclosure within the enclosure without any need for tools in the fastening of the support member to the holder. Even though this known fastening system enables rapid and simple fastening of a plate to the desired height within an enclosure, it has turned out that in all applications, the flexible protrusions of the holder included in the fastening system do not provide sufficient support when the plate is being fastened to the support member. In addition, the structure and manufacture of the components included in the fastening system are relatively complex.

SUMMARY

An object of the invention is to eliminate said drawbacks and provide a fastening system of the above-mentioned type having a simple structure and supporting the plate well in all applications when the plate is being installed within the enclosure.

To implement this, the flexible component comprises a flexible catch, which, during the placement of the snap-in fastening means into the locking position, is arranged to yield in a direction perpendicular relative to the longitudinal direction of the holder, wherein the locking means comprise at least one locking element arranged to keep the support member locked in the longitudinal direction of the holder substantially inflexibly, wherein an upper surface of the support member comprises a fastening arrangement for fastening the plate to the support member, and wherein an upper end of the holder comprises fastening means for fastening the holder to an upper end of the corner turret when the support member is locked in the longitudinal direction of the holder substantially inflexibly, the support member is unable to twist, thus providing a firm support for the plate when it is mounted.

Because the snap-in locking is achieved with a component that yields in a direction perpendicular relative to the longitudinal direction of the holder, the flexible component does not have to yield in the longitudinal direction of the holder for achieving the snap-in locking. The support member is arranged to be locked substantially inflexibly in the longitudinal direction of the holder.

The support member preferably comprises two flexible catches arranged to detachably fasten the support member to two locking rails in the holder that extend along the holder. Such a support member is easy to manufacture and install in the holder.

The locking element, which is arranged to keep the support member locked in the holder, is preferably composed of a protrusion provided in the support member and arranged to lock into a recess in the holder for achieving a tenon and mortise type of joint. The structure of such a joint is very simple and easy to manufacture.

The holder preferably comprises two guide means provided in opposite flanks thereof for receiving the support member into a sliding position, in which the locking means are in an open position, allowing the support member to be slidingly and steplessly moved in the longitudinal direction of the holder, supported on said guide means. Such a solution makes it extremely easy to install the support member in the desired position of the holder and at the desired height within the enclosure.

Preferred embodiments of the fastening system of the invention are disclosed in the attached claims.

The main advantage of the fastening system of the invention is that is adequately supports the plate to be installed in the enclosure in all applications when the plate is being installed in the support member and also when the plate is being detached from the support member, and at the same time it enables rapid and easy fastening of the support member to the holder without any need to use tools.

BRIEF DESCRIPTION

Figure 2:
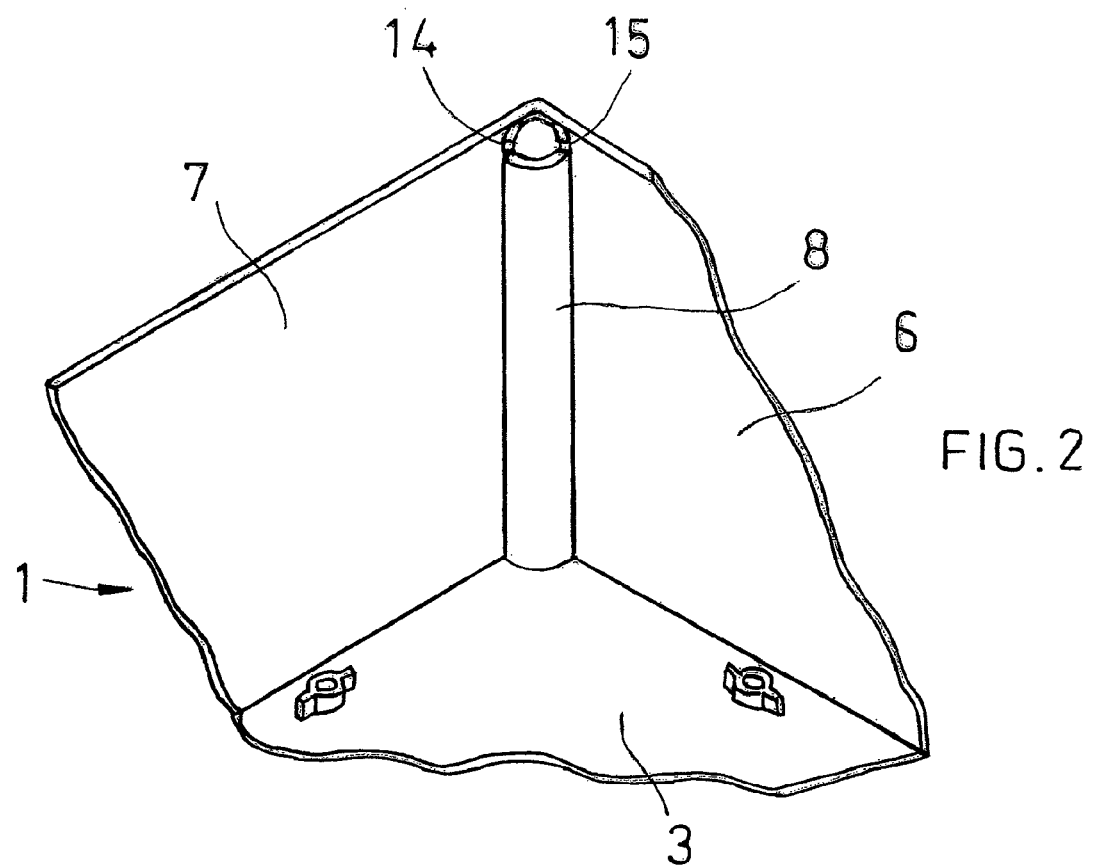

In the following, the invention will be described in more detail in connection with exemplary embodiments with reference to the accompanying drawings, in which FIG. 1 shows the application environment, i.e. an enclosure, of the fastening system of the invention, FIG. 2 shows an inside view of a corner of the enclosure according to FIG. 1, FIG. 3 shows a perspective view of the holder of the fastening system according to the invention, FIG. 4 shows a perspective view of a support member of the fastening system according to the invention, FIG. 5 shows a front view of the support member of FIG. 4, FIG. 6 shows the fastening arrangement of FIGS. 3 and 4 in a sliding position, and FIG. 7 shows the fastening arrangement of FIGS. 3 and 4 in a locking position.

DETAILED DESCRIPTION

FIG. 1 shows an enclosure for electric installations. The enclosure comprises a base 1 and a cover 2. The base 1 comprises a bottom 3, and four sides 4 to 7. The bottom 3 and the sides 6 and 7 are shown in FIG. 2, which shows an inside view of a corner of the enclosure.

FIG. 2 illustrates that all corners of the enclosure are provided with corner turrets 8. When the intention is to install a plate, such as a contact protection plate, within the enclosure of FIGS. 1 and 2, it is installed at a given height depending on the application. For installing the plate within the enclosure, the fastening system illustrated in FIGS. 3 to 7 is used, which fastens to the corner turret 8. The fastening system comprises an elongated holder 9, which has an upper end and a lower end, and a support member 10 to be detachably fastened thereto with a snap-in joint.

The upper end of the holder 9 is designed flange-like and comprises fastening means 11 for fastening the holder vertically to the corner turret 8. The fastening means comprise two protrusions 12, 13 that are installed in notches, grooves or recesses 14, 15 (see FIG. 2) in the upper end of the corner turret 8. Thanks to the protrusions 12, 13 and the notches, the holder 9 can be kept in place in the corner turret 8 sufficiently well in order to be able to install the support member 10 and the plate 16, of which only one corner is shown in FIG. 7, in place. The final fastening of the holder 9 to the corner turret 8 is secured with a screw 29 or the like fastening means, which is inserted into a hole 17 at the upper end, which is flange-like. The lower end of the holder 9 is not fastened to the bottom of the enclosure; it suffices that the upper end of the holder is fastened to the upper part of the corner turret 8. Said arrangement is highly recommendable because it allows a holder 9 of the same length to be used in enclosures having significantly different heights. Another significant advantage is that the plate 16 (see FIG. 7) can be removed from the enclosure simply by opening the screw 29 (or another fastening member) for keeping the holder fastened to the corner turret 8 at the upper end of the holder 9.

The holder 9 comprises two vertical rows of recesses or holes 18. The holes 18 are arranged to receive horizontal pins 19 in the support member 10 (see FIGS. 4 and 5), that can be installed at the pair of holes at whose height the support member 10 is to be installed in the holder 9. The holder 9 of FIG. 3 enables the installation of the holder member 10 at ten different heights. The number of holes 18 in the holder 9 and their distance in the vertical, i.e. longitudinal direction of the holder may naturally be different. It is feasible that the support member 10 only comprises one pin, whereby it correspondingly suffices that the holder 9 only comprises one vertical row of holes.

FIG. 4 shows the support member 10 obliquely from above and FIG. 5 the support member seen in the direction of arrow A of FIG. 4. The support member 10 comprises two flexible branches 20, 21. The branches 20, 21 are arranged to yield in the horizontal direction, i.e. in the direction perpendicular relative to the longitudinal direction of the holder 9, which is illustrated by double arrows in FIG. 4. The design of the branches 20, 21 is such that in practice they do not yield in the longitudinal direction of the holder 9, thanks to which the upper surface 31 of the support member 10 and the fastening hole 28 therein cannot twist (bend), but provide the plate 16 with good support when it is being fastened to the fastening hole 28 of the support member. Instead of the fastening hole 28, the support member 10 may be provided with a recess or another fastening arrangement for fastening the plate 16.

FIG. 6 illustrates from above the holder 9 installed in the corner turret 8 of the enclosure and the support member 10 in a sliding position relative thereto. The support member 10 is placed in the sliding position by threading the support member 10 from above on top of the holder 9. It is also feasible that the support member 10 is placed in the sliding position in an alternative manner by compressing it perpendicularly against the longitudinal direction of the holder (cf. the direction indicated by arrow B of FIG. 6). Once the support member 10 is in the sliding position, the ends of its branches 20, 21 are located in grooves 26, 27 formed by longitudinal rail-like protrusions 22 to 25 in the flanks of the holder 9, which grooves constitute guide means for the support member 10. The grooves 26, 27 enable very easy sliding of the support member 10 in the longitudinal direction of the holder 9. Once the support member 10 has been slid to the desired height, it is compressed (with fingers) in the direction of arrow B, whereby its branches 20, 21 yield to the sides and settle behind the rails 22, 23, wherein they are locked, see FIGS. 6 and 7. At the same time as the compression takes place in the direction of arrow B, the branches 20, 21 are preferably compressed towards one another, whereby the ends of the branches diverge from each other, facilitating the compression in the direction of arrow B. The rails 22, 23 can be called locking rails. As the branches 20, 21 are locked, the pins 19 of the support member 10 enter the grooves 18 in the holder 9 and constitute a tenon and mortise joint. The pins 19 lock the support member 10 at the desired height into the holder 9 and prevent the support member 10 from moving in the longitudinal direction of the holder 9, even if a force in the longitudinal direction of the holder 9 were directed to the support member. The branches 20, 21, the rails 22, 23, the holes 18 and the pins 19 constitute snap-in locking means, which enable locking of the support member 10 into the desired point of the holder without tools.

FIG. 7 shows a top view of the fastening system in the locking position. Reference numeral 16 denotes the plate, which is fastened to the support member 10 at the desired height of the enclosure, and reference numeral 30 is a screw or a corresponding fastening member that keeps the plate 16 fastened to the support member 10.

In the foregoing, the invention has been described by means of one example only and it should therefore be appreciated that the details of the invention may be implemented in a plurality of manners within the scope of the attached claims. Accordingly, the design of the holder 9 and the support member 10 may deviate from what was described. Instead of the holder being provided with holes/recesses, the support member could be provided with holes/recesses, whereby the holder would be provided with one row of pins or a plurality of rows of pins. Instead of pins, other types of protrusions can be used. Thus, it is possible that the locking element is composed of a recess provided in the support member and arranged to be locked into a protrusion in the holder for achieving a tenor and mortise type of joint, whereby, preferably the holder is provided with a plurality of protrusions long the holder. It is feasible that the support member only comprises one flexible branch. However, the advantage of two branches is that they enable the placement of the support member in the sliding position of the figure. Instead of a flexible branch (or flexible branches) locking into the holder 9, the support member may comprise another type of flexible catch (or other types of flexible catches) that lock(s) into a rail or locking member in the holder. It is also feasible that the catch(s) is (are) arranged in the holder 9, whereby the support member 10 comprises corresponding rails or other locking members that enable the locking of the support member into the holder.

What is claimed is:

1. A fastening system for fastening a plate, such as a front plate or a contact protection plate, within an enclosure for electric installations, the fastening system comprising:
   an elongated holder configured to be placed vertically within the enclosure and arranged to be fastened to a corner turret within the enclosure; and
   a support member arranged to be fastened to the elongated holder with snap-in fastening means, the snap-in fastening means being arranged, in a locking position, to fasten the support member detachably to the elongated holder by means of a flexible component included in the fastening system in a direction perpendicular to the longitudinal direction of the elongated holder, and the snap-in fastening means comprising locking means for fastening the support member to the elongated holder at different points along the length of the elongated holder while the snap-in fastening means is in the locking position, wherein the flexible component comprises a flexible catch, the flexible catch, during the placement of the snap-in fastening means into the locking position, being configured to yield in a direction perpendicular to the longitudinal direction of the elongated holder, wherein the locking means comprises at least one locking element arranged to keep the support member locked in the longitudinal direction of the elongated holder substantially inflexibly, wherein an upper surface of the support member comprises a fastening arrangement for fastening the plate to the support member, and wherein an upper end of the elongated holder comprises fastening means for fastening the elongated holder to an upper end of the corner turret, wherein the elongated holder comprises two guides provided in opposite flanks of the elongated holder, respectively, for receiving the support member into a sliding position, and wherein when the support member is received by the elongated holder in a sliding position, the locking means is in an unlocking position, and the support member is slidingly movable in the longitudinal direction of the elongated holder, and is supported by the two guides, wherein the elongated holder further comprises two locking rails extending along most of the length of the elongated holder and the flexible catch comprises two flexible arms, and wherein when the support member is in the sliding position, the two flexible arms are arranged to engage with the two guides, respectively, and when the snap-in locking means is in the locking position, the two flexible arms are arranged to detachably fasten the support member to the two locking rails.

2. A fastening system as claimed in claim 1, wherein the locking element is composed of a protrusion provided in the support member and arranged to be locked into a recess in the elongated holder for achieving a tenon and mortise type of joint.

3. A fastening system as claimed in claim 1, wherein the elongated holder is provided with a plurality of recesses along the elongated holder.

4. A fastening system as claimed in claim 1, wherein the two guides of the elongated holder each comprise a groove, each of the two grooves being configured to receive an end of a respective one of said two flexible arms when the support member is in the sliding position.

5. A fastening system for fastening a plate within an enclosure, comprising:
   an elongated holder configured to be placed vertically within the enclosure and configured to be fastened to a corner turret within the enclosure; and
   a support member including snap-in fasteners configured to be placable in a locking position so as to detachably fasten the support member to the elongated holder, the snap-in fasteners including a flexible component and a locking arrangement configured to fasten the support member to the elongated holder at different points along the length of the elongated holder when placed in the locking position, wherein the flexible component includes a flexible catch, which, during the placement of the snap-in fasteners into the locking position, is configured to yield in a direction perpendicular to a longitudinal direction of the elongated holder, wherein the locking arrangement includes at least one locking element arranged to keep the support member locked in the longitudinal direction of the elongated holder substantially inflexibly, wherein an upper surface of the support member includes a fastening arrangement for fastening the plate to the support member, and wherein an upper end of the elongated holder includes a fastening device configured to fasten the elongated holder to an upper end of the corner turret, wherein the elongated holder comprises two guides provided in opposite flanks of the elongated holder, respectively, for receiving the support member into a sliding position, and wherein when the support member is received by the elongated holder in a sliding position, the locking arrangement is in an unlocking position, and the support member is slidingly movable in the longitudinal direction of the elongated holder, and is supported by the two guides, wherein the elongated holder further comprises two locking rails extending along most of the length of the elongated holder and the flexible catch comprises two flexible arms, and wherein when the support member is in the sliding position, the two flexible arms are arranged to engage with the two guides, respectively, and when the snap-in locking fasteners are in the locking position, the two flexible arms are arranged to detachably fasten the support member to the two locking rails.

6. A fastening system as claimed in claim 5, wherein the two flexible arms are configured to be snapped in the locking position, the pair of flexible arms clamping the elongated holder and providing resilient forces to bear against side surfaces of the elongated holder in the direction perpendicular relative to a longitudinal direction of the elongated holder.

* * * * *